Jan. 18, 1927. 1,614,999
F. F. SUTHERLAND
MILLING PLASTIC MATERIALS
Filed Sept. 25, 1926 3 Sheets-Sheet 1

INVENTOR:—
FREDERICK F. SUTHERLAND
BY
ATTORNEY.

Jan. 18, 1927.

F. F. SUTHERLAND 1,614,999

MILLING PLASTIC MATERIALS

Filed Sept. 25, 1926    3 Sheets-Sheet 2

INVENTOR.
FREDERICK F. SUTHERLAND
BY
ATTORNEY.

Jan. 18, 1927.　　F. F. SUTHERLAND　　1,614,999
MILLING PLASTIC MATERIALS
Filed Sept. 25, 1926　　3 Sheets-Sheet 3

INVENTOR.
FREDERICK F. SUTHERLAND
BY
ATTORNEY.

Patented Jan. 18, 1927.

1,614,999

UNITED STATES PATENT OFFICE.

FREDERICK F. SUTHERLAND, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

MILLING PLASTIC MATERIALS.

Application filed September 25, 1926. Serial No. 137,710.

My invention pertains to the art of milling compounds of rubber or other plastic substances and has for its object the provision of means for facilitating the plastication of such compounds and also to prevent the generation of undue heat therein during the operation.

In this specification, the preparation of a rubber compound is discussed as the preferred adaptation of this invention to the manipulation of a well known plastic substance, but without limitation of the intent and scope of the appended claims to this particular association.

This invention has particular application to that stage of preparation of the compound generally termed milling, in which operation the green rubber is first broken down on well known mills and at least partially plasticized, then has added to it certain foreign compounding ingredients, particularly the vital accelerators of vulcanization, after which the so compounded mass is further milled until the mix is completed and the desired stage of plasticity attained.

In addition to its particular application to the above defined milling operation, this invention may obviously be adapted to other analogous operations. For instance, to the treatment of compounds on "warming-up" mills; to the customary calendering operation where stock is merely sheeted to a thin gauge or frictioned into a fabric material; or, in fact, to treatment of stock in various manufacturing operations characterized by exposure of the stock to rolling analogous to milling or calendering.

During the milling operation it is necessary that the temperature of the compound be controlled within certain limits. If too cold, imperfect results are inevitable. If too hot, the finally compounded mass is defective, and is exposed to scorching, especially so when the modern high-speed accelerators are used in the batch.

It is customary to attempt to control the temperature of the stock on the mill by seeking to regulate the temperature of the rolls. This is done by flowing water at suitable temperature through the hollow roll shells; by attempting to chill the outer surface of the roll with cold water; by attempting to chill the surface of the rubber filament adhering to the roll by a water spray; or by subjecting both the surface of one of the rolls and the surface of the rubber filament on another roll to cooling water. But these various expedients are of doubtful effect and place undue reliance upon the skill of the operator.

A great amount of heat is generated within the mass of the compound at the "bite" of the rolls at the point where the batch is acted upon by tremendous disrupting forces. Under certain conditions where the mills are run continuously on high speed accelerator stocks it is almost impossible to keep the compound at a safe working temperature, even when the interiors of the rolls are refrigerated by chilled water. In such cases, external surface application of chilled water is not always effective, and there is always the danger of excessively wetting down the surface of the rubber whereby there is actual trapping of water particles within the sheeted stock, thus creating a condition which obviously causes serious troubles in the use of the stock in subsequent final manufacturing operations.

In view of the inherent nature of such compounds to generate excessive internal heat within the zone of influence of the "bite" of the rolls, it is apparent that a close approximation of a proper temperature by the usual methods employed cannot be attained without contacting in one way or another with the hazards inherent in the various temperature control expedients.

In special consideration of the inevitable excessive heating of the stock at the "bite", it has become an important object of my invention to apply the herein described temperature control objective to the solution of the heating at this point. This temperature control is in a measure attained by providing what is in effect chilled lubrication to the internal structure of the disrupted mass of compound at the instant it becomes subjected to the influence of the "bite", thus minimizing the heating tendency, and in addition, provide a highly effective chilling of the compound both at the "bite" and adjacent thereto.

This result is accomplished by subjecting the compound at the "bite" and adjacent thereto to an intensely chilled blast of water vapor wherein the amount of water is scientifically and positively controlled within limits that render its application harmless to the ultimate product, as more fully explained hereafter.

In the appended drawings, which show a preferred embodiment of an appropriate apparatus for carrying out this invention.

Figure 1:
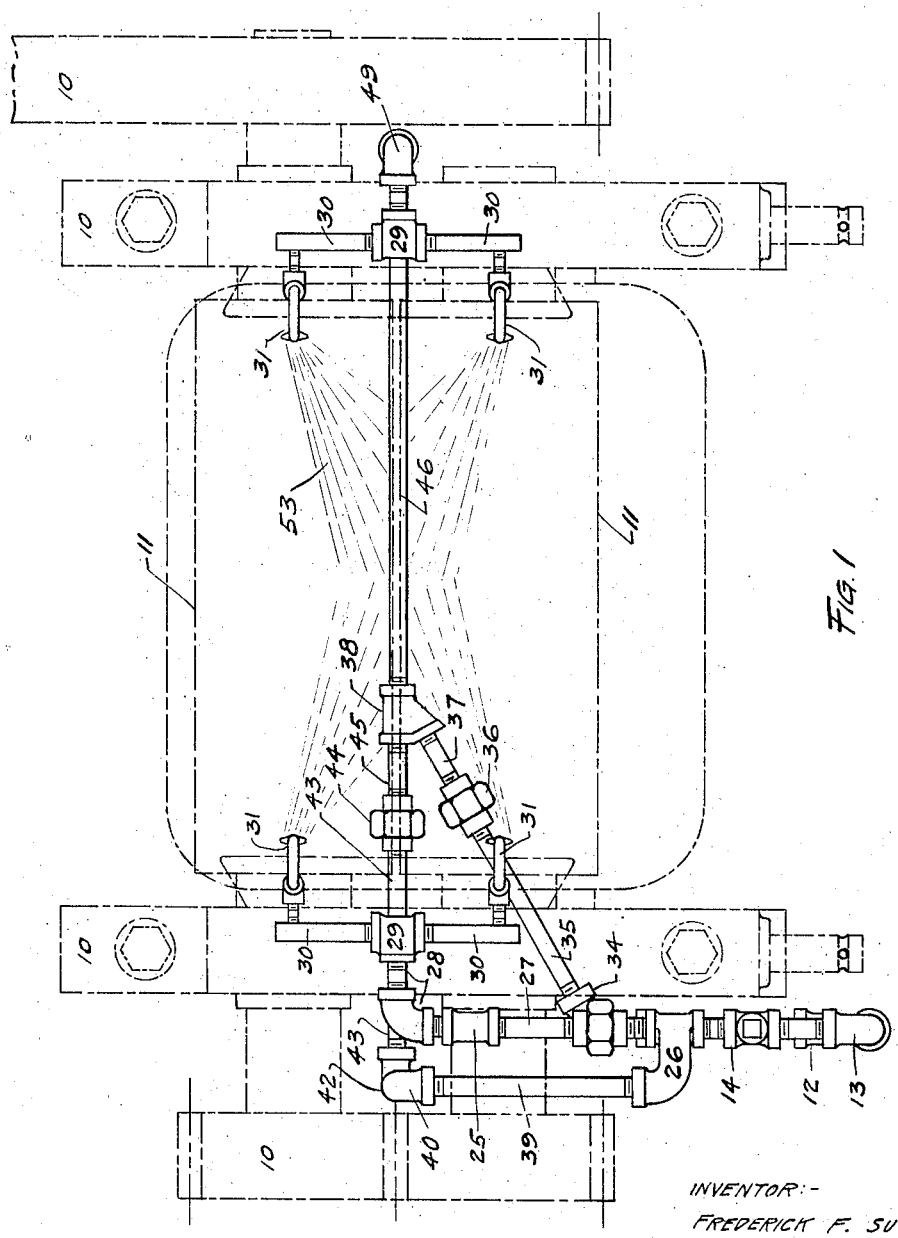
Figure 1, is a plan view of the apparatus, the conventional mill being shown by broken lines.
Figure 2:
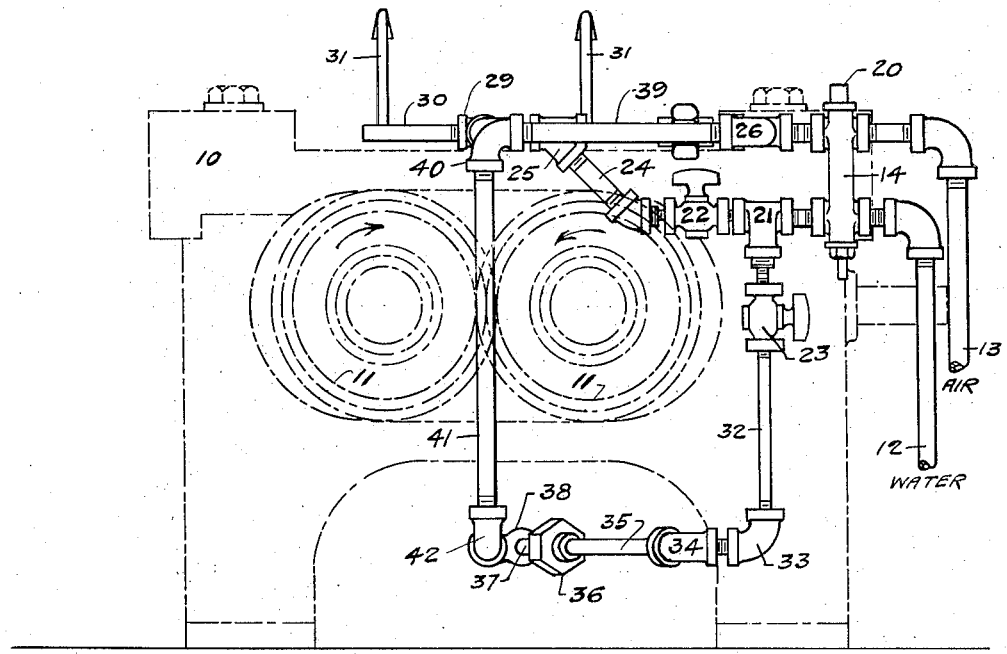
Fig. 2, is an end elevation of the left end as shown in Fig. 1.

Referring particularly to the drawings:

Numeral 10 designates a conventional rubber mill having rolls 11 (all in broken lines).

A primary water supply pipe 12 supplies cool water to the related system, and compressed air is furnished through the line 13. Pipes 12 and 13 are connected to one side of a single control, double port stop cock valve 14. This valve (see Figs. 2, 4, 5 and 6) has inlet connection 15 for the pipes 12 and 13 and corresponding outlets 16. The tapered stop spindle 17 is provided with ports 18 and 19 registering with the inlets and outlets for the air and water lines respectively. By turning the spindle 17 at its head 20 the air and water supply lines are simultaneously controlled and any desired degree of feed attained.

Upon opening the valve 14 water is admitted into the system through T 21, from whence one branch line leads to the left hand spray units of the system through a control cock 22 and one other branch line leads to the right hand spray units through a similar cock 23. It will thus be noted that although the opening of valve 14 to its full extent will let a considerable volume of water into the system, yet the distribution of this so admitted water to the injectors or mixing valves 25 and 38 is capable of positive control by manipulating the cocks 22 and 23. In this manner the density of the chilled spray of vapor is always under control.

The preferred manner of fitting these spray elements 31 implies the use of similar sets at the left and right hand sides of the mill in the interest of securing a uniform distribution of the chilled vapor over the extent of the mill surface. The elements constituting the left side installation will be first described.

Figure 8:
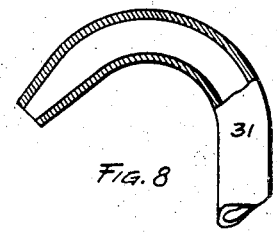
Fig. 8, is an elevation, partially in section, showing one of the spray nozzles.
Figure 4:
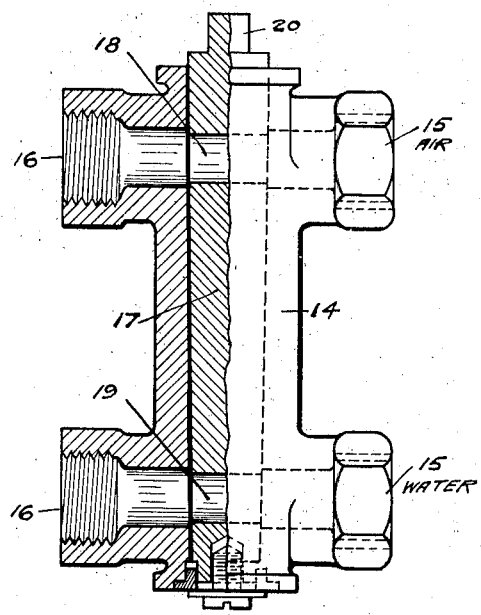
Fig. 4, is a side elevation, partially in section, of a preferred single control valve for air and water.
Figure 5:
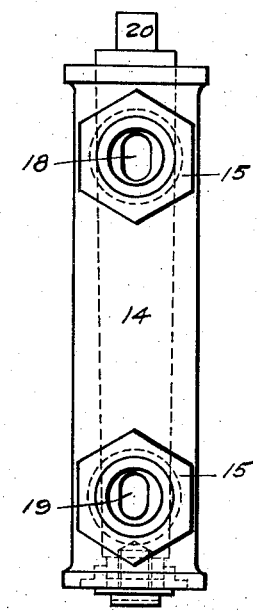
Fig. 5 is an end elevation of Fig. 4, showing the air and water valve ports open.
Figure 7:
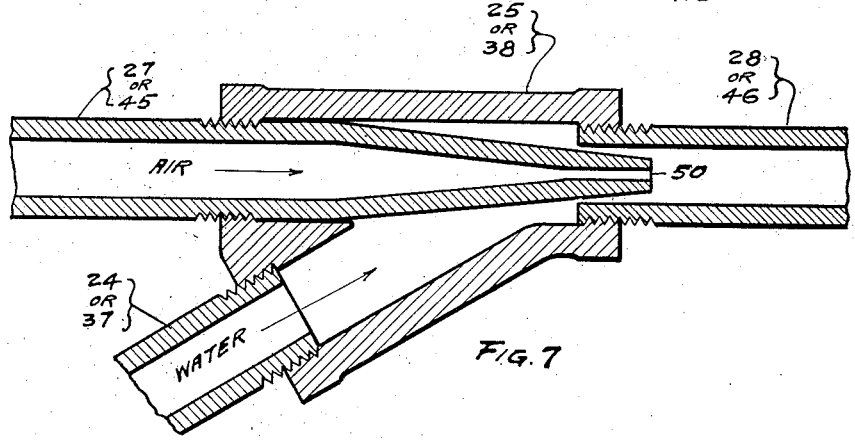
Fig. 7, is a sectional elevation of a preferred form of mixing jet, of the injector type.

The water cock 22 admits a regulated supply through pipe 24 into the injector element or mixer 25 (a duplicate of which, numbered 38, is provided in the supply line to the right side elements). Air passing through valve 14 is received in a three-way element 26 from whence it is directly distributed to the respective left and right side spray nozzles 31, as follows: The pipe 27 conducts the air for this left side direct to the injector 25 (see Figs. 1 and 7). The construction of the similar injectors 25 and 38 is fully illustrated in Fig. 7, and needs no further discussion, except to show a preferred manner of forming the reducing nozzle 50 as a part, respectively, of air leads 27 and 45. The air and water having met within the injector 25 and formed a vapor, the mixture is conducted through pipe and L assembly 28; through T 29; through distribution unit 30, and finally expelled through the reducing nozzle on spray elements 31. The extremity of 31 may be any conventional reducing nozzle desired and is generally illustrated in Fig. 8.

The right hand side distribution from the common valve 14 is provided for as follows: The water cock 23 admits a regulated supply through a piped system consisting generally of fittings, 32, 33, 34, 35, 36 and finally through pipe 37 which leads into injector 38. Air passing through element 26 is distributed by a piped system consisting generally of fittings, 39, 40, 41, 42, 43, 44, and finally through pipe 45 directly into the injector 38. The air and water having met within 38, resulting in the mixing described for the corresponding left side injector 25, the mixture is conducted through the pipe line assembly 46, 47, 48, 49, to finally discharge through the spray nozzles 31 which are connected to the pipe line assembly by elements 29 and 30, the elements 29, 30 and 31 being duplicates of those on the left side.

The spray nozzles are so arranged and directed that the chilled water vapor will be distributed against the bank of rubber at the "bite" of the rolls, and, preferably, a portion of the spray will be directed on the surface of that part of the compound adhering to one roll and somewhat in advance of the "bite". This distribution insures that the oncoming stock will be beneficially chilled by the evaporation of the chilled water particles and at the same time injects a high-velocity spray into the disrupted mass within the "bite" where the previously described lubrication benefits are realized. The direction of the spray may be changed as desired by rotating the elements 31 about their threaded-in connections 51 (see Fig. 3).

Figure 3:
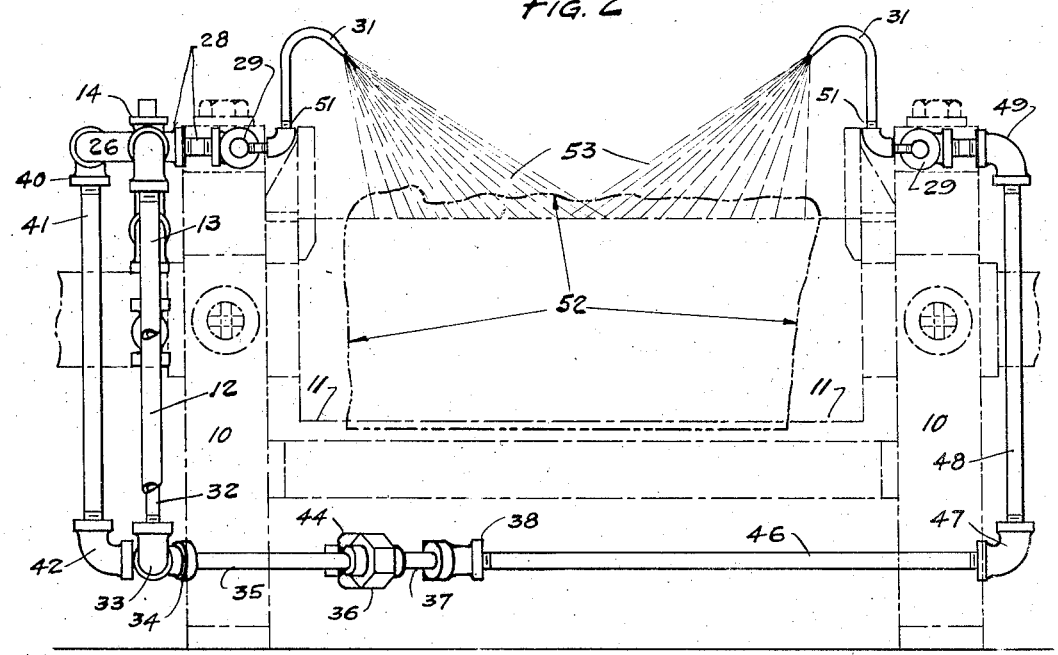
Fig. 3, is a front elevation.
Figure 6:
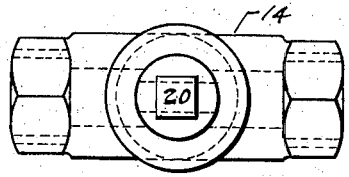
Fig. 6, is a top view of Fig. 4; ports open.

The compound on the mills is indicated generally as 52 (Fig. 3). The general direction of the chilled spray is casually indicated as 53 (Figs. 1 and 3).

In my experiments with chilled water vapor as a cooling medium for rubber milling it at once became apparent that the cooling effect alone was but one of the advantages realized. The other advantage lies in the discovery that this drenching of the rubber with the chilled water vapor, along the "bite" of the rolls where the compound is being violently disrupted and its internal structure eddying at high velocity with the well known resultant heating, supplies to the disrupted area what may be termed a highly efficient lubricant. The remarkable effect of this chilled water vapor lubricant is to prevent to a material degree the generation of this heat of friction at this point and greatly assist in plasticating the compound. This phenomena of heat prevention at this point is probably due to the fact that the well dispersed particles of chilled water vapor, blown at high velocity in a dense spray, become intimately incorporated within the disrupted mass of the compound where the most violent friction is present. While the effect is but momentary, prior to evaporating off and dispelling some of the heat of the rubber, yet this momentary presence of water vapor within the mass undoubtedly forms an unexpected form of lubrication that assists the violent internal adjustment of the rubber particles within the zone of influence of the "bite", and relieves the previous internal heating.

When the density of the vapor is properly regulated there is no appearance in the final milled sheets of trapped water particles. Apparently the rapid evaporation of the vapor within the hot, disrupted mass is completely effected by the time any single portion has been carried through the "bite". The perfectly dispersed spray does not appear to have any deleterious effect upon the partially assimilated compounding ingredients within the rubber batch. The final sheeted batch treated by this method comes through the processing much quicker and notably smoother due to the facility and rapidity with which the mixing and plastication proceeds.

In milling operations it is customary to resort to blending with batches of new and unworked green rubber other smaller quantities of scrap accumulated in subsequent operations. This scrap is very generally of a refractory character, for instance when it contains stock that has been scorched or otherwise rendered unsuitable for use in direct process, consequently it is difficult to break down, plasticate, and be made to uniformly disperse and mix with the new batch. This class of blending has always been the source of trouble in milling; but when treated by this process better and quicker results are obtained, due largely to the previously discussed effects of internal lubrication at the critical point of trouble at the "bite".

Due to the provision for exactly regulating the amount of water to be atomized and intensely chilled by action of the air blast, the operative is enabled to "set" his chilled vapor spray to that degree of density best suited to the particular stock under treatment, whereby an ideal and practically uniform temperature of the stock may be continuously maintained without exposing the batch to the hazards of excessive drenching with ordinary surface water distribution. Or, of course, the density as well as the temperature of the vapor may be varied during the different stages of milling to suit the conditions.

To illustrate a practical example of the operation of the chilled spray the following test was made: The compressed air used was of a temperature above 80°, and the incoming water supply was 69°. The system was operated under these conditions and the spray of water vapor at the point of contact with the rubber was 56°, representing a drop of 13° in the temperature of the water used. The mills were operated with success, and without undue heating of the stock under these conditions, all temperatures being Fahrenheit.

The effective temperature of the chilled vapor blast at its point of application on the rubber can be varied at will through a wide range by varying the amount and pressure of air liberated; the amount and initial temperature of the water utilized; or by regulating the orifice of the discharge nozzle—all to suit varying individual conditions. Therefore, when the term "chilled water vapor spray", or equivalent expressions are used it is to be understood to mean, generically, an atomized spray of water driven by an air blast and chilled by the effect of the expansion of the air through a suitable reducing nozzle, or its equivalent.

Having described a preferred embodiment of this invention, I claim:

1. That method of facilitating the working of a plastic compound by rolling, comprising; subjecting the stock to a spray of chilled water vapor within the zone of influence of the bite of the roll units.

2. That method of facilitating the working of a plastic compound by rolling, comprising; subjecting the stock to a spray of chilled water vapor directed locally upon the portion of the disrupted stock within the bite of the roll units.

3. That method of facilitating the working of a plastic compound by rolling, comprising; subjecting the stock to a dense spray of chilled water vapor wherein the water vapor is chilled and driven directly against the compound by an escaping jet of compressed air.

4. That method of facilitating the working of a plastic compound by rolling, comprising; subjecting the stock to a dense spray of chilled water vapor directed upon the surface of the disrupted stock within the bite of the roll units and upon a portion of the stock advancing thereto.

5. That method of facilitating the working of a plastic compound by rolling, comprising; subjecting the surface of the stock remote from the roll unit to the cooling influence of a dense spray of chilled water vapor.

6. That method of facilitating the working of a plastic compound by rolling, comprising; subjecting the stock to an air driven and chilled spray of water vapor directed upon the portion of the disrupted stock within the bite of the roll units, the density of the vapor being sufficient to partially cool and lubricate the disrupted stock, without saturation.

7. That method of facilitating the working of a plastic compound by rolling, comprising; subjecting the stock to an air driven and chilled spray of water vapor directed upon the portion of the disrupted stock within the bite of the roll units, there being sufficient moisture content to lubricate the disrupted stock as it passes within the bite, without saturation.

8. That method of facilitating the working of a plastic compound by rolling, comprising; subjecting the stock to a spray of water vapor chilled and driven by a blast of expanding compressed air, the moisture content being controlled to partially cool by evaporation and lubricate that portion of the disrupted stock within the bite of the rolls, without permanent wetting.

9. That method of facilitating the working of a plastic compound by rolling, comprising; subjecting the surface of the stock remote from the roll unit within and adjacent to the bite of the rolls to a spray of chilled water vapor driven by a blast of expanding compressed air, the moisture content being controlled to the capacity of the hot stock to substantially evaporate it before complete passage through the bite.

10. That method of facilitating the working of a plastic compound by rolling, comprising; subjecting the exposed surface of the stock to a spray of chilled water vapor wherein the moisture content deposited on the stock is not in excess of the capacity of the stock to evaporate the same.

In testimony whereof I affix my signature.

FREDERICK F. SUTHERLAND.